Dec. 28, 1965 R. P. PETERSON 3,226,124

DAMPENED SUSPENSION SYSTEMS FOR STEREOPHONIC PHONOGRAPH PICKUPS

Filed April 2, 1963

INVENTOR.
RONALD P. PETERSON
BY [signature]
ATTORNEY

United States Patent Office 3,226,124

Patented Dec. 28, 1965

3,226,124

DAMPENED SUSPENSION SYSTEMS FOR STEREOPHONIC PHONOGRAPH PICKUPS

Ronald P. Peterson, Indianapolis, Ind., assignor to Radio Corporation of America, a corporation of Delaware Filed Apr. 2, 1963, Ser. No. 269,980
6 Claims. (Cl. 274—24)

The present invention relates to phonographs, and more particularly to tone-arm suspension systems for stereophonic pickups in stereophonic phonographs and like multiple-channel record-playing apparatus and equipments.

Present stereophonic phonographs require the use of light-weight, low-mass pickup devices for faithfully translating dual-channel sound recordings into corresponding dual-channel output signals which are to be amplified and reproduced as sound in auditory perspective. The dual-channel recording components and the output signals are generally stereophonically related, whereby the reproduced sound is that of the original, for example, as recorded through two laterally-spaced microphones from a single sound source, in accordance with known practice.

As in any phonograph or like equipment, a pivoted tone-arm is generally used to carry and guide the pickup device on the record at a desired angle and with a vertical force or downward pressure for proper light tracking of the pickup stylus in the stereophonic sound groove.

In a suspension system for phonograph pickups in tone-arms for record players, record changers and the like, adapted for use in accordance with the invention, the free end of the tone-arm or tone-arm structure is adapted to rest on and be supported by the playing surface of the record, for example, as shown and described in a copending application for Suspension Systems for Phonograph Pickups, Serial No. 242,427, filed December 5, 1962, and assigned to the same assignee as this application.

As shown and described in the above application, by resting the free end of the tone-arm on the record surface and pivoting the pickup therein for independent vertical movement at the stylus end, friction at the pivot axis for vertical movement may be reduced to a minimum because the pickup and its associated suspension elements can be extremely light in weight and low in mass as is desirable. Such a system has the advantages of: (1) providing a substantially constant tracking force on the pickup stylus; (2) unitary movement of the stylus about the pickup pivot to reduce or prevent wow effects on warped records; and (3) protecting the stylus from the results of the accidental application of additional downward force on the tone-arm, which force might otherwise cause record damage.

However, a stereophonic phonograph pickup of light weight and low mass that is free to move vertically independently of the tone arm structure by which it is carried, and effectively damped against lateral movement, is subject to stereophonic distortion in its signal output, notably of the type commonly known as cross-talk. This distortion results in a lack of stereophonic separation in the reproduced sound output.

This form of distortion is particularly noticeable at the lower frequency end of the audio-frequency response range of the pickup device because the inherent light weight of the pickup device and its pivoted free mounting in the tone-arm structure tends to reduce its response to the stereophonic or vertical signal components of the record groove modulation as compared to the lateral record groove modulation components. The inequality in vertical and lateral response is particularly noticeable at the lower end of the audio-frequency range where vertical movement of the stylus tends to cause corresponding movement of the pickup and reduced vertical signal translation.

It is, therefore, an object of this invention to provide an improved suspension system for a stereophonic phonograph pickup or like signal-translating device that is free to move vertically or normal to the plane of the playing surface of a record in operation and independently of the tone-arm structure by which it is carried, which provides effective vertical damping substantially equalized with lateral damping against movement of the pickup device in response to stylus movement vertically and laterally in a stereophonic or like multi-channel sound groove, thereby to reduce cross-talk in the signal output therefrom.

It is also a further object of this invention to provide an improved stereophonic pickup mounting system for tone-arm structures in phonograph record playing equipment, for effective damping of the pickup device against vertical movement substantially equal to inherent damping provided by the tone-arm structure against lateral movement with the stylus in response to vertical and lateral components of the record modulation, without substantially increasing the overall stylus pressure in the record groove in operation.

It is a still further object of this invention to provide an improved suspension and damping system for a stereophonic phonograph pickup device which is pivotally supported in a tone-arm structure and which operates effectively to stabilize the pickup against low-frequency resonance and vertical feedback movement from the stylus and thereby reduce cross-talk in the signal output therefrom, without appreciably interferring with the record protection features thereof or increasing the resultant overall stylus pressure in the record groove.

In accordance with the invention, in a phonograph record player or the like there is combined with a pivoted tone-arm laterally movable at its free end over a record to be played, a stereophonic pickup device mounted in said end of the tone-arm for lateral movement therewith over said record and having a stylus for engaging the record groove for response to the lateral and vertical components of the groove modulation and stereophonic sound translation in the course of said lateral movement over said record. In this construction the pickup device is coupled with the relatively larger mass of the tone-arm by reason of its being mounted in said arm, and is thus damped against movement with the stylus in response to the lateral components of the rcord groove modulation.

For reasons hereinbefore given, the tone-arm structure includes means providing an inner pivot to which the pickup device is connected for substantially free pivotal movement at its stylus end vertically toward and away from or normal to the record surface, and independently of the tone-arm structure by which it is carried and effectively damped against lateral movement.

The vertical damping of the pickup to reduce cross-talk is made substantially equal to, or as equally effective as, the lateral damping action provided in connection with it or imparted to it by the relatively large tone-arm mass. At the same time vertical resonance effects in the suspension system are lowered or brought below the useful operating frequency range of the equipment.

In one form of the invention a spring element, such as a flat leaf spring or the like, is mounted in and connected at one end with the tone arm and frictionally engages the pickup at the other or free end thereof with a light wiping contact against the pickup casing to frictionally couple the pickup for vertical motion to the tone-arm mass. The contact with the spring element is preferably at the forward or stylus end of the pickup, and in any case, at a radial distance from the vertical pivot axis of the pickup in the arm, whereby the leverage made available permits the contact pressure of the spring element to be low while providing a frictional force between pickup and tone-arm sufficient for effective damping of the pickup movement about said axis.

The vertical compliance of the pickup, with its mechanical resistance, and the mass of the pickup tend to resonate broadly in the lower-frequency end of the audio-frequency range in which the pickup or the apparatus operates, thereby tending to distort the vertical response of the pickup. The frictional contact provides coupling of the pickup with the relatively larger mass of the tone-arm and thereby increases the damping of the pickup device against movement with the stylus about said pivot in response to vertical components of the groove modulation. The mass component then coupled with said compliance and resistance serves to lower the vertical resonance frequency or bring it below the useful frequency range of the equipment. By thus reducing the vertical resonance at low frequency and equalizing the vertical and lateral damping of the pickup against stylus movement in the stereophonic record groove, cross-talk in the signal output from the pickup may be substantially reduced.

The damping or vertical frictional coupling with the tone-arm mass may thus be applied at low cost by a single simple leaf spring element bearing against the pickup or casing and acting along the longitudinal axis of center line which is normal to the pivot axis.

The invention will further be understood from the following description of an embodiment thereof when considered in connection with the accompanying drawing, and its scope is pointed out in the appended claims.

In the drawing, FIGURE 1 is a top view, in perspective, of a phonograph record player, representing any suitable record playing apparatus, and provided with a tone-arm and pickup suspension system therein embodying the invention;

Figure 1:
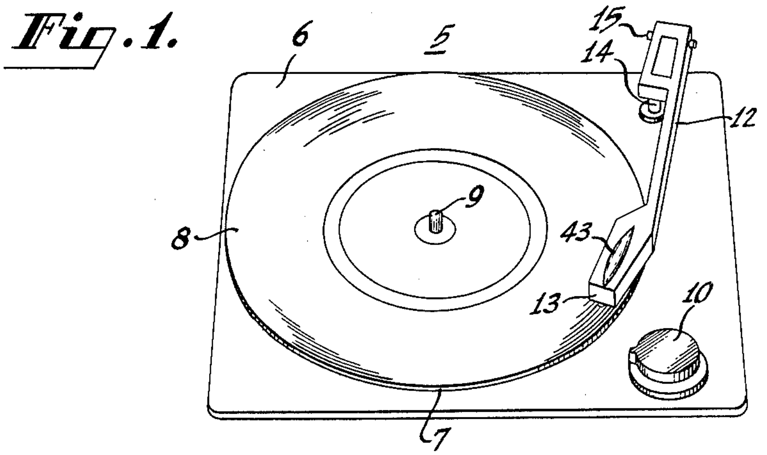

Referring to the drawing, wherein like reference numerals are used to designate like elements and parts in the different figures, and referring particularly to FIGURE 1, a manual record player 5, representing any suitable phonograph record player equipment for which the invention is adapted, is provided with a motor board or turntable base 6 on which is mounted the usual motor-driven turntable 7, with a record 8 located on the turntable in the playing position on the central turntable spindle 9 thereof. The record player is further provided with a suitable control knob 10 mounted on the base for operation in any suitable manner as required.

Figure 2:
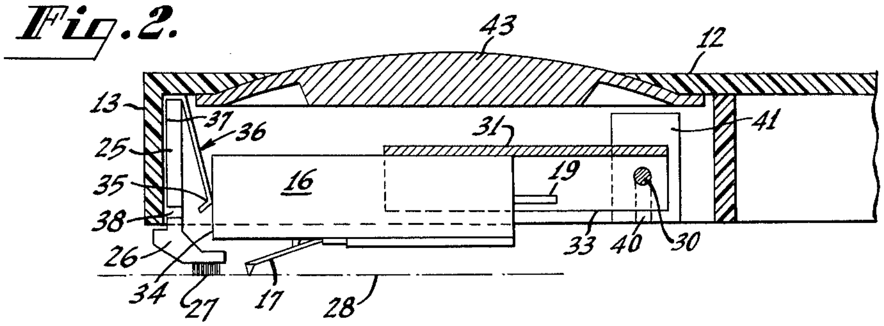
FIGURE 2 is a side view, and partly in section, of the forward end of the tone-arm of FIGURE 1 showing the pickup suspension system and interior construction thereof.
Figure 3:
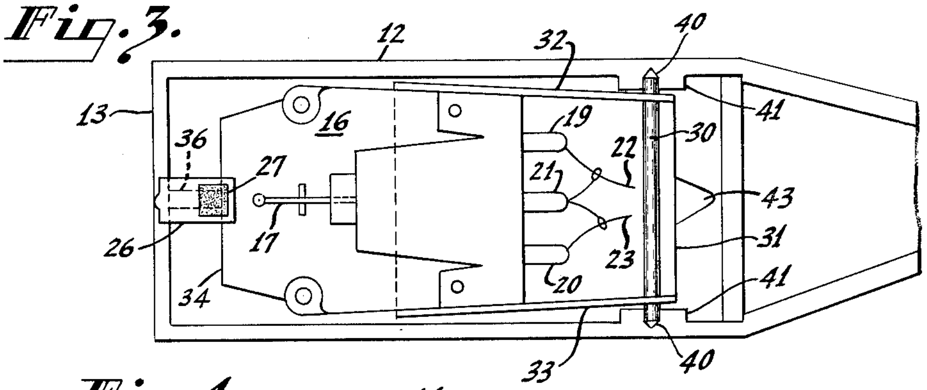
FIGURE 3 is a bottom view of the tone-arm end and suspension system of FIGURE 2, showing further details of construction.

Referring to FIGURES 2 and 3 along with FIGURE 1, a pivoted tone-arm or tone-arm structure 12, laterally and vertically movable at its free or forward end 13 on pivot axes 14 and 15, respectively, is provided for carrying and guiding a stereophonic pickup device 16 therein laterally over the record on the turntable. The pickup device 16 may be of any suitable construction for stereophonic or dual-channel sound translation and adapted to be mounted in a tone-arm structure as indicated, with the stylus 17 extending thereform to track the record groove. The pickup device in the present example is provided with stereophonic signal output terminals 19 and 20 for the two channels, with a common or ground terminal 21 therefor in accordance with known construction for such devices, and these in turn are connected with shielded channel output leads 22 and 23 respectively, as indicated in FIGURE 3.

The forward end 13 of the tone-arm also carries a tone-arm support or bracket element 25 having a lower outer end or foot 26 extending downwardly therefrom to engage and rest on the upper playing surface of the record. This foot has a bottom pad element 27 of soft material which slidably engages the record surface indicated by the dash-and-dot line 28 of FIGURE 2. The weight of the free end of the tone-arm is thus taken entirely by the support elements as it rests or rides smoothly on the record surface in operation. The stylus is thus free of the vertical pressure normally required to support the tone-arm and can respond more faithfully to the record groove modulation, and particularly a stereophonic recording which has both vertical and lateral sound components.

The tone-arm further includes an inner pivot or pivot pin 30 to which the pickup device 16 is connected for movement toward and away from the record surface 28. This is in a vertical direction at the stylus end thereof with a horizontal turntable. In the present embodiment, the pivot for the pickup device is provided in connection with a bracket element 31 by which the pickup is carried, and which is in the form of a thin metallic strip, shaped to conform to and receive the pickup device therein as indicated in FIGURES 2 and 3.

The bracket element 31 may thus be of a U-shaped cross-section having integral side flanges 32 and 33 on either side thereof (forming the legs of the U in transverse cross-section) extending downwardly when mounted in position on the pivot pin 30 in the tone-arm. The pivot pin extends through transversely aligned bearing openings in the rear ends of the downwardly extending flanges as indicated, and the pickup is thus mounted within the bracket and between the flanged sides thereof. The pickup is limited in pivoting downwardly from the tone-arm by an extension of the foot 26.

The forward end 34 of the pickup device, or the casing thereof, is in light sliding frictional contact with the free end 35 of a single flat leaf damper spring 36 mounted in the tone-arm and connected therewith. The damper spring in the present example is retained at its fixed end between the tone-arm support element 25 and the inner wall of the tone-arm, as indicated more clearly in FIGURE 2. The spring 36 is extended rearwardly of the support element to an integral base strip or body portion 37 having a pair of tabs, one of which is indicated at 38, extending therefrom around the support element 25, as indicated in FIGURE 2.

In the present example, the pivot pin 30 is pressed into the tone-arm through open slots 40 extending from the bottom of the tone-arm upwardly into suitable bosses 41. The pin is retained in position extending transversely across the tone-arm between the bosses by frictional seating in the slots. The tone-arm is also provided with a metallic escutcheon plate 43 mounted therein as shown. This may be of any suitable material for ornamental purposes, such as light metal, and the tone-arm 12 may be of suitable plastic material.

Because the tone-arm free end 13 is supported by the foot 26 and pad 27 riding on the record surface 28, the tone-arm forward or free end 13 is maintained substantially fixed in vertically-spaced relation to the record surface in operation and follows vertical undulations therein due to warpage, for example, as the pickup stylus does also at the same time in following the record groove in that surface. Relative vertical movement between the stylus tip and the pickup vertical pivot axis or pin 30 is substantially reduced. This reduces longitudinal movement of the stylus tip in the groove and resultant distortion effects on uneven or warped records.

The forward end surface 34 of the pickup device stands substantially vertically, or normal to the record playing surface 28, and the spring tip 35 provides damping contact therewith at an extended radial distance from the axis of the pivot pin 30. This light contact thus provides sufficient force to couple the tone-arm mass with the pickup and effectively damp movement of the pickup device about the pivot pin 30 in response to vertical movement of the stylus and the vertical components of the record groove modulation, without appreciably adding to the vertical loading of the stylus tip and the stylus pressure in the groove.

In this suspension system, therefore, a stereophonic pickup is carried by the tone-arm structure and effectively damped thereby against lateral movement with the stylus in response to lateral components of the groove modulation. The pickup device is relatively light and is free to move vertically toward and away from or normal to the plane of the playing surface of the record, and independently of the tone-arm structure by which it is carried. The pickup device is effectively damped against said lateral movement.

The spring damping means is provided in connection with the tone-arm to act on a surface of the pickup or the case thereof and frictionally couple the low mass of the vertically-free and pivoted pickup along with its mechanical resistance and compliance in the vertical direction, to the larger or higher mass of the tone-arm structure by which the pickup is carried.

Due to the distance between the pickup pivot and the contact point of the spring means, a relatively light pressure provides effective damping against vertical movement substantially equal to the inherent damping provided by the tone-arm against lateral movement. The vertical and lateral damping of the pickup against movement due to the vertical and lateral components of the groove modulation transmitted through the stylus are equalized or balanced. The additional vertical damping equalization obtained by the present pickup is particularly useful and effective at the lower end of the audio-frequency range, for example, below 200 cycles, and aids in lowering the vertical resonance frequency of the pickup.

Figure 4:
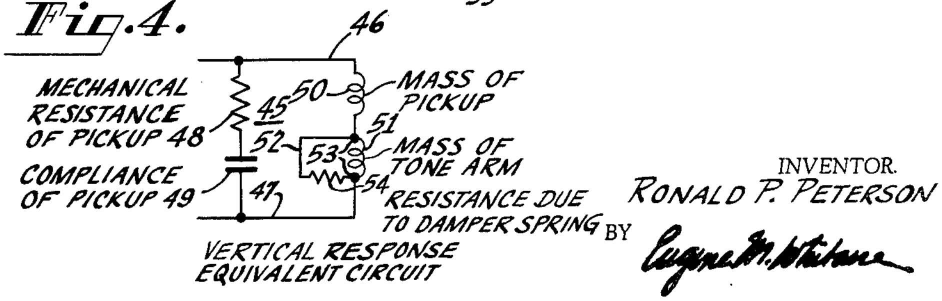
FIGURE 4 is a schematic circuit diagram illustrating the operating relation of certain components of the tone-arm and suspension system of FIGURES 1 to 3.

Referring to FIGURE 4, the equivalent circuit 45 of the pickup and arm, in response to vertical stylus movement resulting from record groove modulation, connected between the two high and low side conductors 46 and 47 respectively, comprises a series resistor 48, representing the mechanical resistance of the pickup to vertical movement, and in series with the resistor, the circuit tuning capacitor 49, representing the vertical compliance of the pickup. The mass of the pickup moveable on the pivot pin axis 30 is represented by the shunt tuning inductor 50 connected across the circuit in series with an inductor 51, representing the tone-arm mass acting in the vertical direction. The tone-arm mass is normally shorted out of circuit by a shorting bar or conductor 52 connected between its terminals 53.

Because the pickup device is held in the arm on the horizontal pivot pin 30 and is thus effectively decoupled from the arm and its mass vertically, the inductor 51 is normally short-circuited or out of circuit, in the absence of frictional coupling to the tone arm, and the pickup broadly resonates vertically at a low frequency determined by the tuning elements 48, 49 and 50. The friction of the damper spring 36 between the tone-arm mass and the pickup introduces resistance in the shorting connection between its terminals, is indicated by the resistor 54 in circuit with the conductor 52. This allows the tone-arm mass inductance to appear in the circuit to a degree sufficient to lower the vertical resonance frequency of the pickup to a desired value, generally out of the useful operating range of the pickup device or of the apparatus. The tone-arm mass in the circuit thus presents detuning and damping and reduces the vertical output at low frequencies in the area of undesired resonance.

Referring again to FIGURES 2 and 3 and the construction of the damping means, it will be seen that it would be possible to apply the spring at more than one point, as on each side of the longitudinal center line of the pickup device for example, with additional cost and complication. The damping applied by a single leaf spring element of the type shown is at present preferred and is highly effective since it may be arranged to bear directly against the forward or stylus end of the pickup in a longitudinal direction and at a right angle to and relatively widely spaced from the pivot axis of the pickup in the tone arm.

In combination with a stereophonic pickup device, the suspension system of the present invention provides equalization of the vertical damping to the lateral damping of the pickup device, by frictionally coupling the device with the tone-arm vertically and most effectively at the low-frequency end of the operating range. The application of the frictional damping is kept at a low pressure to maintain the tracking of the pickup with a relatively light stylus pressure.

What is claimed is:

1. In a phonograph record player having a turntable and a pivoted tone-arm laterally moveable at a free end in substantially fixed spaced relation to the playing surface of a record on said turntable, the combination with a stereophonic pickup device connected with the free end of the tone-arm for lateral movement therewith and having a stylus for engaging the sound groove of said record, of means in said tone-arm providing an inner pivot to which said pickup device is connected for independent vertical movement toward and away from the record surface at the stylus, and means connected with the tone-arm in spaced relation to said pivot and frictionally engaging a surface of said pickup device substantially normal to the plane of said record surface for equalizing with relatively-low contact pressure the damping of the pickup device against vertical and lateral movement in response to stylus movement in said sound groove.

2. In a phonograph record player, the combination with a pivoted tone-arm laterally moveable at its free end over a record to be played, of a stereophonic pickup device mounted in said end of the tone-arm for lateral movement therewith over said record and having a stylus for engaging the record groove for stereophonic sound translation in the course of said movement, said pickup device being thereby coupled with the relatively-larger mass of the tone-arm and damped against movement with the stylus in response to lateral components of the record groove modulation, means in said tone-arm providing an inner pivot to which said pickup device is connected for substantially free pivotal movement at its stylus end vertically toward and away from the record surface independently of the tone-arm, and means including a relatively-light resilient damping spring connected with the tone-arm and engaging a surface of said pickup device with a wiping contact for frictionally coupling the pickup device with said relatively-larger mass of the tone-arm and substantially equally damping said pickup device against movement with the stylus about said pivot in response to vertical components of said groove modulation, thereby to reduce cross-talk in the translated signal output from said pickup device.

3. In a phonograph record player having a turntable and a pivoted tone-arm laterally moveable at its free end in substantially fixed spaced relation to the playing surface of a record on said turntable, the combination with a stereophonic pickup device connected with the free end of the tone-arm for lateral movement therewith and having a stylus for engaging the sound groove of said record, of means in said tone-arm providing an inner pivot to which said pickup device is connected for independent vertical movement toward and away from the record surface at the stylus end thereof, and a single flat leaf-spring damper element connected with the tone-arm and laterally centered on and frictionally engaging the moveable stylus end of said pickup device with a relatively-light contact pressure in the direction of and normal to the axis of said pivot for equalizing the damping of the pickup device against vertical and lateral movement in response to stylus movement in said sound groove and thereby reducing cross-talk in the translated signal output from said pickup device.

4. In a phonograph record playing apparatus, the combination with a tone-arm structure moveable over a disc record to be played and supported by the playing surface thereof, of a stereophonic pickup device connected for movement with said tone-arm structure laterally over said record and pivoted therein for free and independent movement vertically toward and away from said record surface at the stylus end thereof, and spring damper means including a single flat leaf spring connected at one end with the tone-arm structure and having a free end frictionally engaging said pickup device at the stylus end and coupling the tone-arm mass vertically with the pickup mass and its vertical mechanical resistance and compliance to lower the vertical resonance frequency of the pickup device and equalize the damping of said pickup device in response to vertical and lateral stylus movement, and thereby reduce cross-talk in the signal output therefrom.

5. In a phonograph record-playing apparatus, the combination with a tone-arm structure movable over a disc record to be played and supported in spaced relation to and by the playing surface thereof, of a stereophonic pickup device connected for movement with said tone-arm structure over said record and pivoted therein for free and independent movement toward and away from said record surface at the stylus end thereof, and a single flat leaf spring connected with the tone-arm structure and frictionally engaging said pickup device to damp the pivotal movement thereof with a force substantially equal to the damping force imparted thereto by the connected mass of the tone arm structure in the direction of its movement with said structure, said spring providing said damping force with relatively-light contact pressure acting at an extended radial distance from and normal to the pivotal axis of the pickup device in said tone-arm structure, thereby to maintain the operating stylus pressure increment due to damping equalization at a minimum.

6. In a phonograph record-playing apparatus, the combination with a tone-arm movable at one end over a record to be played and in spaced relation to the playing surface thereof, of stereophonic pickup device connected with said tone-arm end to move directly therewith over said record and having a pivot connection therein for independent movement in a direction toward and away from said record surface, said pickup having a stylus and a predetermined compliance and mechanical resistance in the direction of said movement resonating with the mass thereof in the low frequency end of the audio-frequency range, and a single flat leaf spring connected with the tone-arm and engaging said device for frictionally coupling the mass of the tone-arm with the mass of said device and said compliance and resistance to lower the resonance of said device and impart effective damping thereto against movement in said direction toward and away from said record surface substantially equalized with damping imparted thereto by said tone-arm connection in the direction of the tone-arm movement, said leaf spring providing said damping with relatively-light contact pressure acting at an extended radial distance from and normal to the axis of said pivot connection of the pickup device in said tone-arm, thereby to maintain the operating stylus pressure increment due to damping equalization at a minimum.

References Cited by the Examiner

FOREIGN PATENTS 1,119,536 12/1961 Germany.

NORTON ANSHER, *Primary Examiner.*